United States Patent
Irvin et al.

(10) Patent No.: US 7,276,184 B2
(45) Date of Patent: *Oct. 2, 2007

(54) SURFACTANT ASSISTED NANOMATERIAL GENERATION PROCESS

(75) Inventors: Glen C. Irvin, Rochester, NY (US); Ramesh Jagannathan, Rochester, NY (US); Seshadri Jagannathan, Pittsford, NY (US); Suresh Sunderrajan, Rochester, NY (US); David D. Tuschel, Monroeville, PA (US); William C. Lenhart, Hamlin, NY (US); David J. Nelson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 903 days.

This patent is subject to a terminal disclaimer.

(21) Appl. No.: 10/193,363

(22) Filed: Jul. 11, 2002

(65) Prior Publication Data

US 2003/0054957 A1 Mar. 20, 2003

Related U.S. Application Data (63) Continuation-in-part of application No. 10/033,458, filed on Dec. 27, 2001, now abandoned, and a continuation-in-part of application No. 10/033,422, filed on Dec. 27, 2001, now Pat. No. 6,695,980, which is a continuation-in-part of application No. 09/903,883, filed on Jul. 12, 2001, now Pat. No. 6,595,630.

(51) Int. Cl.
*B01F 3/20* (2006.01)
*B01J 20/02* (2006.01)

(52) U.S. Cl. .................. 252/363.5; 264/4.1; 264/5
(58) Field of Classification Search ............ 252/363.5; 264/4.1, 5
See application file for complete search history.

(56) References Cited

U.S. PATENT DOCUMENTS 4,582,731 A 4/1986 Smith .................... 427/427

(Continued)

FOREIGN PATENT DOCUMENTS

WO 90/03782 4/1990

(Continued)

OTHER PUBLICATIONS

Keenan et al, General College Chemistry, sixth edition, (Harper & Row Publishers, Inc, NY, NY, copyright 1980), pp. 146-147 (Sep. 1980).*

(Continued)

*Primary Examiner*—Daniel S. Metzmaier
(74) *Attorney, Agent, or Firm*—Andrew J. Anderson (57) ABSTRACT

A process for the preparation of nanoscale particulate material is described comprising: (i) combining one or more functional material to be precipitated as nanoscale particles and one or more surface active material in a compressed $CO_2$ phase with a density of at least 0.1 g/cc, where the functional material is substantially insoluble in the compressed $CO_2$ in the absence of the surfactant, the surfactant comprises a compressed $CO_2$-philic portion and a functional material-philic portion, and the compressed $CO_2$ phase, functional material and surfactant interact to form an aggregated system having a continuous compressed $CO_2$ phase and a plurality of aggregates comprising surfactant and functional material molecules of average diameter less than 10 nanometers dispersed therein; and (ii) rapidly depressurizing the compressed $CO_2$ phase thereby precipitating the dispersed functional and surfactant materials in the form of composite particles of average diameter from 0.5 to less than 10 nanometers.

17 Claims, 7 Drawing Sheets

U.S. PATENT DOCUMENTS

| | | | |
|---|---|---|---|
| 4,734,227 A | 3/1988 | Smith | 264/13 |
| 4,734,451 A | 3/1988 | Smith | 524/493 |
| 4,970,093 A | 11/1990 | Sievers et al. | 427/575 |
| 5,030,669 A * | 7/1991 | Hendrickson et al. | 516/31 |
| 5,158,704 A * | 10/1992 | Fulton et al. | 516/9 |
| 5,238,671 A | 8/1993 | Matson et al. | 423/397 |
| 5,266,205 A | 11/1993 | Fulton et al. | 210/639 |
| 5,301,664 A | 4/1994 | Sievers et al. | 128/200.23 |
| 5,382,623 A * | 1/1995 | DeSimone et al. | 524/557 |
| 5,639,441 A | 6/1997 | Sievers et al. | 524/200.23 |
| 5,725,802 A * | 3/1998 | Chittofrati et al. | 516/22 |
| 5,789,505 A | 8/1998 | Wilkinson et al. | 526/204 |
| 5,814,678 A * | 9/1998 | Randolph | 522/18 |
| 5,944,996 A | 8/1999 | DeSimone et al. | 210/634 |
| 6,010,542 A | 1/2000 | DeYoung et al. | 528/483 |
| H1839 H | 2/2000 | Combes et al. | 528/483 |
| 6,131,421 A | 10/2000 | Jureller et al. | 68/13 R |
| 6,177,103 B1 | 1/2001 | Pace et al. | 424/489 |
| 6,221,275 B1 | 4/2001 | Choi et al. | 252/74 |
| 6,228,826 B1 | 5/2001 | DeYoung et al. | 510/291 |
| 6,299,906 B1 | 10/2001 | Bausch et al. | 424/489 |
| 6,316,030 B1 | 11/2001 | Kropf et al. | 424/489 |
| 6,403,672 B1 * | 6/2002 | Randolph et al. | 522/79 |
| 6,416,624 B1 | 7/2002 | Nielsen et al. | 162/155 |
| 6,595,630 B2 | 7/2003 | Jagannathan et al. | 347/85 |
| 2002/0118245 A1 | 8/2002 | Jagannathan et al. | 347/21 |
| 2002/0118246 A1 | 8/2002 | Jagannathan et al. | 347/21 |
| 2004/0052944 A1 | 3/2004 | Al-Duri et al. | 427/261 |

FOREIGN PATENT DOCUMENTS

| | | |
|---|---|---|
| WO | 99/52504 | 10/1999 |
| WO | 02/45868 | 6/2002 |

OTHER PUBLICATIONS

Fessedenden et al, Organic Chemistry, (Willard Grant press, Boston, MA) p. 15 (Aug. 1980).*

Drew Myers, Surfactant Science and Technology, second edition (VCH Publishers, NY, NY, copyright 1992), pp. 152-155, (Jul. 1994).*

* cited by examiner

Fig. 7 the desired material on a substrate. Alternatively, the supercritical fluid contains a dissolved first reagent which is contacted with a gas containing a second reagent which reacts with the first reagent to form particles of the desired material deposited as a film on the substrate.

SURFACTANT ASSISTED NANOMATERIAL GENERATION PROCESS

CROSS-REFERENCE TO RELATED APPLICATIONS

This application is a continuation-in-part of U.S. Ser. No. 09/903,883 filed Jul. 12, 2001 (now U.S. Pat. No. 6,595,630), a continuation-in-part of U.S. Ser. No. 10/033,458 filed Dec. 27, 2001 (corresponding US Patent Publication No. 2003/0121447, now abandoned), and a continuation-in-part of U.S. Ser. No. 10/033,422 filed Dec. 27, 2001 (now U.S. Pat. No. 6,695,980), the disclosures of which are incorporated by reference herein.

FIELD OF THE INVENTION

This invention describes a surfactant assisted supercritical fluid/compressed liquid process for generating nanoscale materials having particulate dimensions in the range of 0.5 to 10 nanometers.

BACKGROUND OF THE INVENTION

Nanomaterials are defined as substances with particulate dimensions that are on the order of up to 0.1 µm. In the case of symmetric materials such as spherical particles, the particle diameter is the defined quantity while in the case of anisotropic materials such as rods, fibers or plates, at least one of the three axial dimensions is required to be in the defined size range.

Supercritical fluids have been used in the precipitation of fine solid particles. The phenomenon was observed and documented as early as 1879 by Hannay, J. B. and Hogarth, J., "On the Solubility of Solids in Gases," Proc. Roy. Soc. London 1879 A29, 324, who described the precipitation of solids from supercritical fluids: "When the solid is precipitated by suddenly reducing the pressure, it is crystalline, and may be brought down as a 'snow' in the gas, or on the glass as a 'frost' . . . ". More recently, Mohamed, R. S., et al. (1988), "Solids Formation After the Expansion of Supercritical Mixtures," in Supercritical Fluid Science and Technology, Johnston, K. P. and Penninger, J. M. L., eds., describes the solution of the solids naphthalene and lovastatin in supercritical carbon dioxide and sudden reduction of pressure to achieve fine particles of the solute. The sudden reduction in pressure reduces the solvent power of the supercritical fluid, causing precipitation of the solute as fine particles. Tom, J. W. and Debenedetti, P. B. (1991), "Particle Formation with Supercritical Fluids—a Review," J. Aerosol. Sci. 22:555-584, discusses rapid expansion of supercritical solutions (RESS) techniques and their applications to inorganic, organic, pharmaceutical and polymeric materials. The RESS technique is useful to precipitate small particles of shock-sensitive solids, to produce intimate mixtures of amorphous materials, to form polymeric microspheres and deposit thin films. Critical properties of common RESS solvents are provided.

Smith U.S. Pat. Nos. 4,582,731, 4,734,227 and 4,734,451, describe typical RESS processes involving rapidly releasing the pressure of a supercritical solution of a solid solute to form a film of the solute on a substrate, or to form a fine powder of the solute.

Sievers et al. U.S. Pat. No. 4,970,093 discloses a process similar to the RESS process for depositing a film on a substrate by rapidly releasing the pressure of a supercritical reaction mixture to form a vapor or aerosol which deposits a film of the desired material on a substrate. Alternatively, the supercritical fluid contains a dissolved first reagent which is contacted with a gas containing a second reagent which reacts with the first reagent to form particles of the desired material deposited as a film on the substrate.

Sievers, et al. U.S. Pat. No. 5,301,664 discloses the use of nebulizers utilizing medicaments dissolved in supercritical fluids to deliver physiologically active substances to a patient, preferably to lung tissues of the patient. The supercritical fluid process provides particles of the desired size range for administration to the patient's lungs (less than about 6.5 micrometers).

The use of supercritical co-solvents, e.g., carbon dioxide and nitrous oxide, to dissolve poorly soluble active principles is described in Donsi, G. and Reverchon, E. (1991), "Micronization by Means of Supercritical Fluids: Possibility of Application to Pharmaceutical Field, " Pharm. Acta Helv. 66:170-173.

A modification of the RESS process is described in PCT Publication WO 90/03782 which involves dissolving a desired solid in a supercritical fluid and adding an anti-solvent which is miscible with the supercritical fluid but not with the solute in order to precipitate the solute. Such an anti-solvent process, referred to as the "gas anti-solvent" (GAS) precipitation process is also discussed in Debenedetti, P. G., et al. (1993), "Application of supercritical fluids for the production of sustained delivery devices," J. Controlled Release 24:27-44. The GAS process is also discussed with respect to production of insulin powder in Yeo, S-D, et al. (1993), "Formation of Microparticulate Protein Powders Using a Supercritical Fluid Antisolvent," Biotechnology and Bioengineering 41:341-346.

In most cases, usefulness of the previously disclosed rapid expansion of supercritical solutions type processes have been limited to precipitation of solutes which may be directly dissolved in the supercritical fluid, and the fine materials (particles, fibers, powders, films, etc.) generated typically have particles sizes reported to be in the range of hundreds of nanometers to several micrometers.

Sievers et al. U.S. Pat. No. 5,639,441 describes an alternative process for forming fine particles of a desired substance upon expansion of a presurized fluid, wherein the substance is first dissolved or suspended in a first fluid, which is then mixed with an immiscible second fluid and the mixture is reduced in pressure to form a gas-borne dispersion. While the disclosed process is described as increasing the range of substances which can be delivered as fine particles by rapid pressure reduction of a carrier fluid, the particles sizes obtained are still reported to be in the 0.1 to 6.5 micrometer range.

Sun et al. "Preparation of Nanoscale Semiconductors Through the Rapid Expansion of Supercritical Solution (RESS) into Liquid Solution", Proceedings of the $5^{th}$ International Symposium on Supercritical Fluids, 8-12 April, Atlanta USA (2000) describe a process comprising expansion of a supercritical ammonia/Pb(NO$_3$)$_2$ solution into a solution of NaS in ethanol such that nanoparticles of PbS having an average particle size of 4 nm are produced. This process is limited by the fact that it is a reactive process where the reactants have to be soluble in supercritical solutions.

Combes et al., in US Statutory Invention Registration H1,839 describes a supercritical fluid process specifically for precipitating tonor additive wax particles. While the process is generally described as resulting in particles in the size (diameter) range of from 0.001 μm-4.0 μm, the examples indicate that particles with a size of from 0.01 to 5.0 microns are obtained.

Pace et al U.S. Pat. No. 6,177,103, Bausch et al U.S. Pat. No. 6,299,906, and Kropf et al. U.S. Pat. No. 6,316,030 describe processes for generating submicron particles involving expansion of supercritical fluids wherein conventional hydrophilic/hydrophobic surface modifying agents are used. While in some instances the surface modifier may be added to the supercritical fluid prior to expansion thereof, the purpose of the surface modifier typically is to prevent agglomeration of particles after they are precipitated.

Fulton et al. U.S. Pat. Nos. 5,158,704 and 5,266,205 and Matson et al U.S. Pat. No. 5,238,671 describe supercritical fluid systems comprising a continuous nonpolar fluid phase, an immiscible polar fluid (e.g., water) phase having a solute material dissolved therein, and a surfactant, wherein the nonpolar fluid, polar fluid and surfactant intermix to form a reverse micelle system comprising dynamic aggregates of surfactant molecules surrounding a core of the polar fluid and solute material dispersed in the continuous nonpolar fluid phase. Potential applications for such systems are described as including chromatography, protein separations, solute extractions, chemical reactions as described in U.S. Pat. No. 5,238,671, and gas phase reactions wherein polar catalysts or enzymes may be molecularly dispersed in a nonpolar gas phase.

The use of supercritical $CO_2$ has been suggested as an alternative to organic cleaning solvents, particularly in combination with reverse micelles or microemulsions, as described in *Supercritical Fluid Cleaning*, J. McHardy and S. Sawan, Eds., Noyes Publications, Westwood, N.J. (1998), pp. 87-120, Chapter 5, entitled "Surfactants and Microemulsions in Supercritical Fluids" by K. Jackson and J. Fulton. U.S. Pat. Nos. 5,789,505, 5,944,996, 6,131,421 and 6,228,826 describe cleaning processes employing carbon dioxide as solvent along with surfactants having $CO_2$-philic portions and hydrophilic or otherwise $CO_2$-phobic portions, wherein the combination of $CO_2$ and surfactant are useful for removing $CO_2$-phobic (including hydrophilic) contaminants from a substrate. U.S. Pat. No. 6,131,421 in particular describes the formation of a reverse micelle system useful for removing hydrophilic contaminants when water is also included with the carbon dioxide and surfactant. There is no disclosure, however, of the use of such materials in a rapid expansion process for generating fine particles of a desired material having particulate dimensions in the range of 0.5 to 10 nanometers.

U.S. Pat. No. 6,010,542 describes a method of dyeing substrates in carbon dioxide, comprising combining liquid or supercritical carbon dioxide with a dye and an amount of surfactant sufficient to solubilize, emulsify, or disperse the dye in the carbon dioxide, and then dyeing the substrate with the dye composition. There is no disclosure, however, of the use of such dispersed dye compositions in a rapid expansion process for generating fine particles of a desired material having particulate dimensions in the range of 0.5 to 10 nanometers.

PCT Publication No. WO 02/45868 A2 describes a method for the patterned deposition of a material comprising the steps of dissolving or suspending the material in a solvent phase comprising compressed carbon dioxide, and depositing the solution or suspension onto a surface, evaporation of the solvent phase leaving a patterned deposit of the material, wherein the method is described as being particularly sutable for the patterned deposition of polymers and small molecules in organic light emitting diodes and organic transistors. It is generally stated that small organic molecules, polymers and inorganic particles ranging in size from 1 nm to 1 μm can be deposited from compressed carbon dioxide, and that in some instances small amounts of surfactants such as perfluorinated polyethers can be added to aid in formation of a homogeneous solution or suspension. The examples thereof, however, in each instance describe only the deposition of carbon dioxide soluble polymers, with or without added surfactant, and there is no disclosure of the generation of fine particles of a desired material having particulate dimensions in the range of 0.5 to 10 nanometers.

U.S. Pat. No. 6,221,275 describes a process for increasing the conductivity of a liquid where crystalline materials having major dimensions of less than 100 nm are generated and dispersed by direct evaporation into a low vapor pressure liquid by heating the substance to be dispersed in a vacuum while passing a thin film of the fluid near the heated substance and cooling the fluid to control its vapor pressure. It is reported that nanocrystalline aluminum oxide produced by the process had an average grain size of less than 3 nm. There is no disclosure, however, of the use a rapid expansion process for generating nanoscale materials.

It would be desirable to provide a simple supercritical fluid/compressed liquid process for generating nanoscale particulate materials having a particulate size of less 10 nm.

SUMMARY OF THE INVENTION

In accordance with one embodiment of the invention, a process for the preparation of nanoscale particulate material is described comprising: (i) combining one or more functional material to be precipitated as nanoscale particles and one or more surface active material in a compressed $CO_2$ phase with a density of at least 0.1 g/cc, where the functional material is substantially insoluble in the compressed $CO_2$ in the absence of the surfactant, the surfactant comprises a compressed $CO_2$-philic portion and a functional material-philic portion, and the compressed $CO_2$ phase, functional material and surfactant interact to form an aggregated system having a continuous compressed $CO_2$ phase and a plurality of aggregates comprising surfactant and functional material molecules of average diameter less than 10 nanometers dispersed therein; and (ii) rapidly depressurizing the compressed $CO_2$ phase thereby precipitating the dispersed functional and surfactant materials in the form of composite particles of average diameter from 0.5 to less than 10 nanometers.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present invention enables the preparation of nanoscale particulate material to be formed by the non-reactive processing of one or more functional materials that are solids and/or liquids at ambient temperature and pressure, in conjunction with one or more surfactant/dispersant material, within a carrier fluid that comprises carbon dioxide that is in the compressed gas, liquid and/or supercritical fluid phase with a density $\geq 0.1$ g/cc. The one or more functional materials are dispersed in the carrier fluid (which may be a mixture of one or more supercritical fluids/compressed liquids and/or cosolvents) in the form of micelle aggregates formed with one or more suitable dispersants/surfactants to create a precursor formulation. Controlled depressurization of this precursor formulation results in the evaporation of the carrier fluid and the formation of the nanoscale particulate material in the desired size regime. Nanoscale particles produced in accordance with the invention may include functional materials useful, e.g., in imaging applications, including photographic and printing applications, and in particular inkjet printing applications, in electronic display device applications, including color filter arrays and organic light emitting diode display devices, in coating applications, in polymer filler applications, in data recording, in wear resistant and/or lubrication/tribological coatings, in microstructure/nanostructure architecture building, in antistatic coatings, in optical coatings, in lithographic mask, and in heat-transfer.

The precursor formulations formed in the process of the present invention contain a functional material and a surfactant, aggregates of which are dispersed in a compressed carbon dioxide fluid having a density greater than 0.1 grams/cc. The compressed carbon dioxide fluid may be in the form of a compressed gas, a compressed liquid and/or a supercritical fluid, which is maintained at a temperature and a pressure suitable for the formation of a dispersion of aggregates of the functional material and the surfactant in the compressed fluid. Preferably, the formulation conditions are temperatures in the range of from 0 to 100° C. and pressure in the range from greater than 1 to about 400 atm, more preferably temperatures from 10 to 60° C. and pressure from 40 to about 400 atm.

Carbon dioxide has unique physical properties and in general to date, only a small class of materials are known which have appreciable solubility in $CO_2$. These materials that have appreciable solubility are termed $CO_2$-philic. Materials that are substantially insoluble in $CO_2$ are termed $CO_2$-phobic. In accordance with the invention, functional materials which are substantially insoluble in compressed $CO_2$ are dispersed in a continuous compressed $CO_2$ phase with the aid of surfactants having a $CO_2$-philic portion and a $CO_2$-phobic portion having affinity to the functional material. The surfactant included in the precursor formulation is selected to interact with the functional material and the compressed carbon dioxide to form an aggregated system (e.g., which can comprise micellar assemblies or microemulsions) comprising a $CO_2$ continuous phase having a plurality of aggregates of average diameter less than 10 nanometers dispersed therein which comprise surfactant and functional material molecules.

Surfactants are amphiphilic entities that contain a component that is soluble in the bulk phase and a component that is not soluble in the bulk phase. Traditional surfactants used for solubilization in aqueous (or nonaqueous, for that matter) media are classified as comprising hydrophilic and hydrophobic components. The hydrophilic part is the water soluble component and the hydrophobic part is the water insoluble component. Drawing from this terminology, surfactants to be used for forming dispersions of aggregates of $CO_2$-phobic materials in compressed $CO_2$ in the process of the invention are defined as comprising a $CO_2$-philic part that is soluble in the compressed $CO_2$ phase and a $CO_2$-phobic, functional material-philic part that is insoluble in the compressed $CO_2$ phase and which has an affinity towards the functional material. In general hydrophilic components are $CO_2$-phobic but hydrophobic components may or may not be $CO_2$-philic; i.e., criteria for choice (identification) of specific surfactants to be used for solubilization of materials in compressed $CO_2$ cannot be made based solely on the knowledge of surfactants used in traditional liquid (aqueous or non-aqueous) phase systems.

Representative surfactants containing $CO_2$-philic and $CO_2$-phobic portions which may be used in accordance with the invention include those described, e.g., in U.S. Pat. Nos. 5,789,505, 5,944,996, 6,131,421, and 6,228,826, the disclosures of which are incorporated by reference herein. The significance of the $CO_2$-philic portion of surfactants used in accordance with the invention is to introduce the surfactant into the $CO_2$ bulk phase. Fluorocarbons and siloxanes have been identified as two preferred classes of materials which may generally function as $CO_2$-philic components in surfactants (see, e.g., *Supercritical Fluid Cleaning*, J. McHardy and S. Sawan, Eds., Noyes Publications, Westwood, N. J. (1998), pp. 87-120, Chapter 5,referenced above, as well as U.S. Pat. Nos. 5,944,996, 6,131,421, and 6,228,826). Another moiety that has been discovered recently is a poly-ether carbonate surfactant (Sarbu, T., Styranec, T., Beckman, E. J., "Non-Fluorous Polymers with Very High Solubility in Supercritical $CO_2$ down to Low Pressures," Nature (2000), 405, 165). Acetylenic alcohols and diols exhibiting surface active properties in $CO_2$ are described in U.S. Pat. No. 5,789,505.

Examples of $CO_2$-phobic groups include molecular units containing various functional groups such as amides, esters, sulfones, sulfonamides, imides, thiols, alcohhols, dienes, diols, acids (such as carboxylic, sulfonic, phosphoric), salts of acids, ethers, ketones, cyanos, amines, quaternary ammonium salts, and thiazoles, as well as lipophilic, oleophilic, and aromatic polymers or oligomers formed from monomers such as ethylene, alpha-olefins, styrenics, acrylates, ethylene and propylene oxides, isobutylene, vinyl alcohols, acrylic acid, methacrylic acid, and vinyl pyrrolidone. The significance of the $CO_2$-phobic portion of surfactants used in accordance with the invention is that the proper selection of this segment to have affinity to the functional material will enable the formation of aggregates comprised of the $CO_2$ insoluble functional material of interest (whether hydrophilic or hydrophobic) and the surfactant dispersed in the compressed $CO_2$ phase. For dispersing functional materials containing ionic or other hydrophilic groups, the $CO_2$-phobic, functional material-philic portion of the surfactant may advantageously be selected from among known hydrophilic groups, and in particular ionic functional groups.

Examples of commercially available fluorocarbon based surfactants (often perfluoropolyether) which may be useful in the process of the invention include Fomblin™ (Ausimont Montedison Group), Fluorolink™ (Ausimont) and Krytox™ (Dupont) families of surfactants. Particularly preferred surfactants for use in the invention include Fluorolink 7004™ (Ausimont Montedison Group) and Fomblin MF-300™ (Ausimont). Descriptions and examples of siloxane based surfactants (often polydimethylsiloxane) which may be used in accordance with the invention include the end-functionalized polysiloxane surfactants described in U.S. Pat. No. 6,228,826.

The selection of a surfactant having a $CO_2$-phobic segment which has affinity for the functional material to be precipitated is crucial to the process of the invention. If a surfactant is chosen which does not have a segment which interacts with the functional material, the functional material will not be able to be dispersed in aggregates formed with the surfactant. For example, the surfactant Fluorolink 7004™ has a segment that is highly fluorinated and the other segment is carboxylic acid based (hydrophilic). The nature of the carboxylic acid segment allows for affinity to functional materials such as via either electrostatic charges, hydrogen bonding, or Van der Waals interactions. The affinity to the functional material is further tunable by varying the identify of cation salts; e.g., $H^+$ may be substituted with $Na^+$ or $NH_4^+$, etc.

The functional materials may be selected from species which are substantially insoluble in the compressed carbon dioxide in the absence of surfactant. Substantial insolubility is intended to mean solubility of less than 0.1 wt %, more preferably less than 0.05 wt %, in compressed carbon dioxide at the temperature and pressure of the precursor formulation. Such materials may be of the types such as organic, inorganic, metallo-organic, polymeric, oligomeric, metallic, alloy, ceramic, a synthetic and/or natural polymer, and a composite material of these previously mentioned. Functional materials can be, for example dyes or pigments, agricultural chemicals, commercial chemicals, fine chemicals, food items, nutrients, pesticides, photographic chemicals, explosive, cosmetics, protective agents, metal coating precursor, or other industrial substances whose desired form is that of a deposited film, fine particle dispersion, or powder. Dyes and pigments are particularly preferred functional materials for use in inkjet printing applications as described, e.g., in copending U.S. Ser. No. 09/903,883 (now U.S. Pat. No. 6,595,630), Ser. No. 10/033,458 (corresponding US Patent Publication No. 2003/0121447) and Ser. No. 10/033,422 (now U.S. Pat. No. 6,695,980), incorporated by reference above.

The wt. ratio of compressed $CO_2$ fluid to functional material in the precursor formulation will typically be from about 100,000:1 to about 1:1, more preferably from about 5,000:1 to about 50:1, so that after suitable mixing with the surfactant and the compressed fluid the functional material is uniformly dispersed in a thermodynamically stable/metastable mixture with the compressed fluid. The ratio of surfactant to functional material is selected so as to be sufficient to enable the self assembly of aggregates of such materials of less than 10 nm size in the compressed $CO_2$. In general, such aggregates will typically contain less than about 100 molecules of the functional compound, more typically less than about 50 molecules, and preferably less than 25 molecules or even less than 10 molecules of the functional compound, in association with the surfactant. The precise ratio of the surfactant:functional material necessary for forming aggregates of such size will depend upon the specific class of materials, but in general a molecular ratio of at least 0.05:1 will typically be required, with ratios of at least 1:1 preferred and ratios of at least 10:1, 30:1, 60:1 and even 100:1 being more preferred to facilitate formation of dispersed aggregates of less than 10 nm size. While higher levels may be used, molecular ratios of less than 500:1, and more preferably less than 200:1, are preferred.

A method of preparing the precursor formulation will now be discussed. Apparatus which may be used for making the formulation has been disclosed in the pending U.S. application Serial No. 09/794,671 (now U.S. Pat. No. 6,471,327), which is incorporated by reference herein its entirety. Additional suitable apparatus is described in U.S. Pat Nos. 4,582,731, 4,734,227, 4,582,731, 4,734,451, 5,301,664, 5,639,441, 6,177,103, 6,299,906, and 6,316,030, the disclosures of which are incorporated by reference herein. Briefly, the functional material and surfactant are controllably introduced into a formulation reservoir, preferably in the form of powders. The compressed $CO_2$ fluid is also controllably introduced into the formulation reservoir. The contents of the formulation reservoir are preferably suitably mixed using mixing device to ensure intimate contact between the functional material, surfactant and compressed fluid. As the mixing process proceeds, functional material becomes associated with the surfactant in the form of aggregates and becomes dispersed within the compressed fluid. The process of aggregate formation/dispersion, including the amount of functional material and the rate at which the mixing proceeds, depends upon the functional material itself, the initial particle size and particle size distribution of the functional material (if the functional material is supplied as a solid), the surfactant, the temperature, and the pressure within the formulation reservoir. When the mixing process is complete, the mixture or formulation of functional material, surfactant and compressed fluid is preferably a thermodynamically stable/metastable compositions where the functional material is dispersed within the compressed fluid in such a fashion as to be indefinitely contained in the same state as long as the temperature and pressure within the formulation chamber are maintained constant. This state is distinguished from other physical mixtures in that there is no settling, precipitation, and/or agglomeration of functional material particles within the formulation chamber unless the thermodynamic conditions of temperature and pressure within the reservoir are changed. As such, the aggregated dispersion of functional material, surfactant and compressed fluid mixture or precursor formulation is said to be thermodynamically stable/metastable.

The method for rapidly depressurizing the compressed $CO_2$ phase and thereby precipitating the dispersed functional and surfactant materials in the form of composite particles of average diameter from 0.5 to less than 10 nm, and more preferably from 0.5 to 5 nm, will now be discussed. During the depressurization of the formulation vessel, the components of the vessel are expanded through a suitable orifice into an atmosphere, preferably ambient, where the $CO_2$ will become a gas. The dispersed aggregates of functional material and surfactant will begin to precipitate non-reactively into particles and/or agglomerates of particles. Advantageously, the presence of the surfactant limits subsequent growth of particles, thereby enabling the formation of stable particles of less than 10 nm size. The size of the precipitated nanomaterials can be controlled by the appropriate selection of the surfactant material such as the type of functional groups on the molecule as well as the solubility in the compressed $CO_2$ fluid. The size of the precipitated nanomaterials can also be controlled by the ratio of functional material to surfactant, as well as through suitable orifice design and optimization of temperature of solution, pressure of solution, flow rate of solution, and concentrations of the functional materials and surfactants.

The precipitated nanomaterial can be collected by any number of methods. For example, the precipitated nanomaterials may be injected into/onto a suitable substrate sheet for immobilization or the nanomaterials may be collected in a suitable liquid. Due to the surfactant coating of the nanomaterials during the depressurization process, the nanomaterials will be stable and not undergo significant agglomeration. Thereby, discrete nanoparticles can be obtained depending on the processing conditions.

The precipitated nanoscale materials generated by the above process with internal particulate structures having dimensions on the order of 0.5 to 10 nm can exhibit solid or fluid-like properties. A fluid is defined as a substance tending to flow or conform to the outline of its container. A nanofluid may be defined as a substance that exhibits the properties of a fluid described above and which also shows structural particulate features that have nanoscale dimensions. In accordance with a particular embodiment of the invention, a nanofluid is obtained by the described process with a viscosity ranging from 0.1 centipoise to $10^{10}$ centipoise. Formation of such nanofluids are facilitated by the use of sufficiently high molecular ratios of surfactant to functional material, such as at least 10:1, preferably at least 30:1.

EXAMPLES

Experimental Apparatus:

The following is a description of the high pressure system used in these Examples. A system flow diagram is shown below in FIG. 1. The functioning of the system may be described as follows: A source of carbon dioxide is attached to the system (fluid source 11). $CO_2$ is plumbed from the source through heat exchanger (12) to a high pressure piston pump (13) and to a syringe pump (14). Heat exchanger 12 reduces the temperature of the $CO_2$, liquefying it. A cooling bath (not shown) continuously flushes the necessary coolant through the heat exchanger and also through jacketed pumps 13 and 14 so as to maintain the temperature within the system constant. Pumps 13 and 14 connect to a variable volume vessel (15), which is a high pressure stainless steel vessel provided with a stirrer (16), piston (17), and ports for windows (18, 19) and for sensors (20, 21) as well as electrical heating using cartridge heaters (22, 23).

Figure 1:
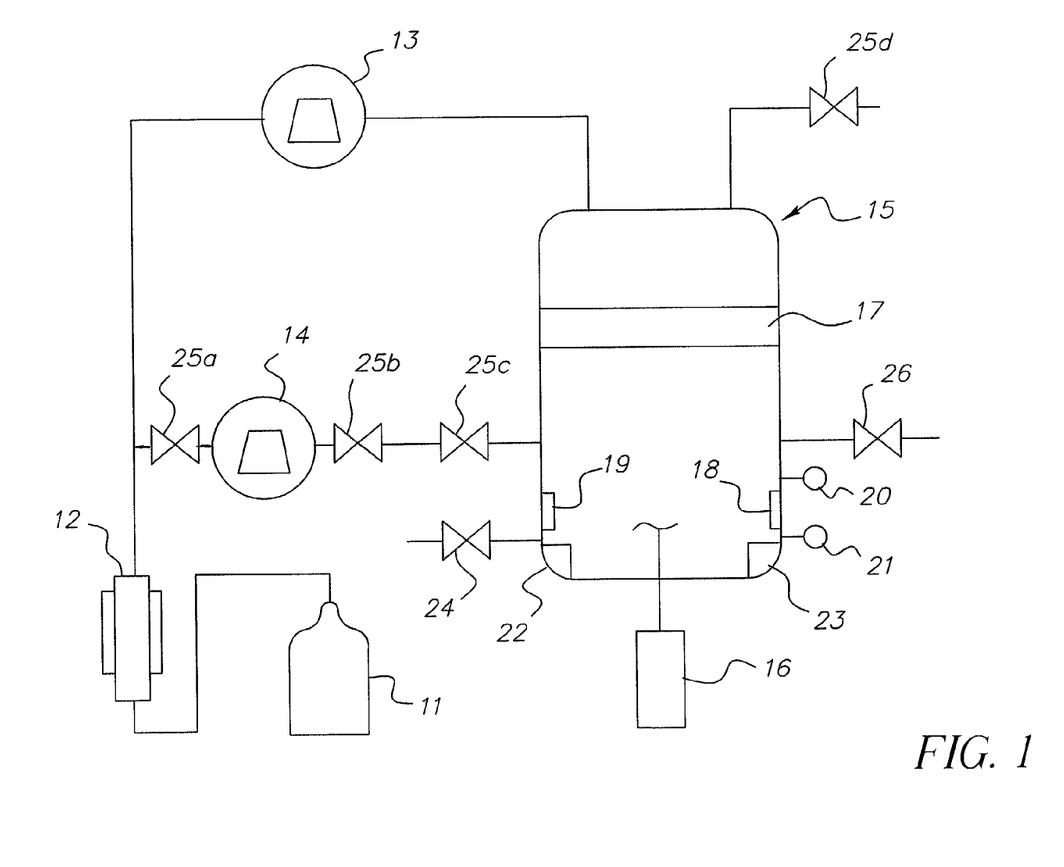
FIG. 1: Schematic of the experimental apparatus.

A known volume of $CO_2$ is loaded into the syringe pump 14. The density of $CO_2$ in the syringe pump is calculated using an equation of state, the volume and the temperature. The variable volume vessel 15 is opened from either the stirrer 16 side or from the piston 17 side (which requires additionally the removal of the piston). A pre-weighed amount of the appropriate functional material and surfactant is placed within the formulation side of vessel 15. The vessel 15 is then re-sealed.

The known amount of $CO_2$ is injected into the formulation side of the variable volume vessel 15. Some $CO_2$ is also added to the piston side of vessel 15 using pump 13. The amount of carbon dioxide added to the piston side relative to that added within the formulation side determines the pressure within the formulation side of vessel 15. Conditions are adjusted until the formulation is at desired pressure and temperature conditions (supercritical or liquid or dense gas phase). Since the amounts of functional material, surfactant and $CO_2$ are known, the concentration of the formulation within the vessel 15 is known. Alternatively, it is possible to use injection valve 24 to introduce a liquid functional material and/or surfactant into the formulation side after pressurization with a known amount of $CO_2$. Additional valves 25a, 25b, 25c, 25d are used to control pressures and material deliveries to vessel 15.

The stirrer 16 is turned on (if desired) for adequate mixing of the material with the dense phase fluid $CO_2$. The pressure and temperature in the formulation side are monitored using pressure sensor 20 and temperature sensor 21 respectively. Conditions within the vessel 15 are monitored through visual observation through the quartz windows 18, 19 provided.

Valve 26 controls the release of formulation out of the formulation side of vessel 15. Any subsequent control over the released formulation may be done through the controlled opening of valve 26 and additional valves, nozzles, aerodynamic lenses, electrostatic rings, high frequency actuators, etc., in the exhaust line.

Example 1

Precipitation of Duasyn Acid Blue AE-02™ Nanomaterial (Ratio of Surfactant to Functional Material=100)

0.01 g of Duasyn Acid Blue AE-02™ (Clariant Corp.) powder and 0.649 g of Fomblin MF-300™ (Ausimont Montedison Group, a surfactant of the formula $CF_3O(CF_2CF(CF_3)O)_3CF_2CO_2^-NH_4^+$) and 6.82 g of $CO_2$ were placed in a high pressure cell at 23° C. and the pressure was adjusted to 3000 psig.

Figure 2:
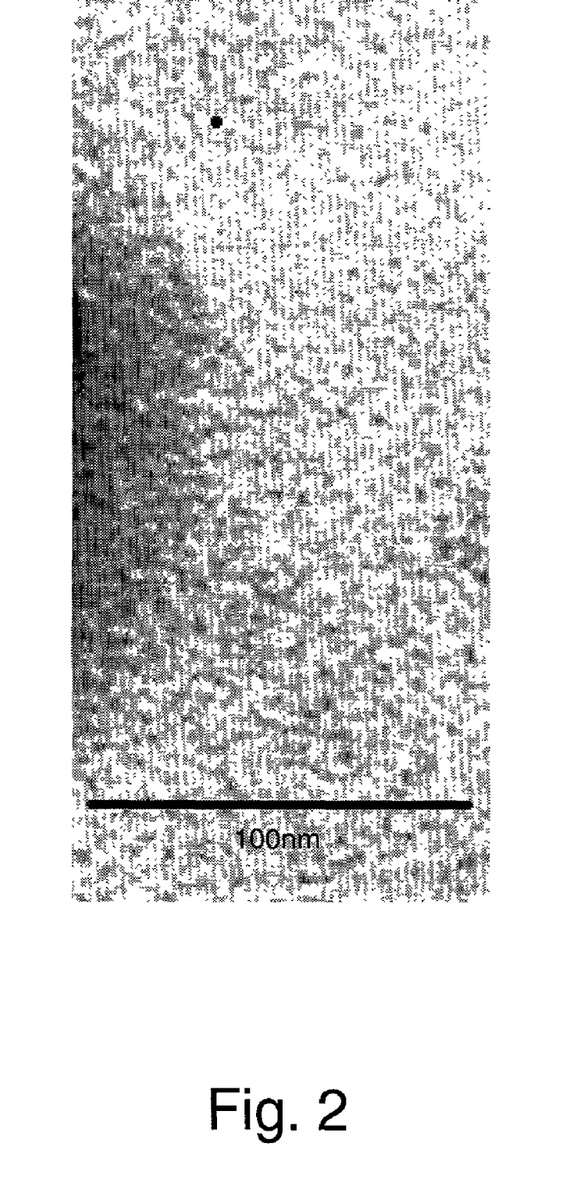
FIG. 2: Transmission electron micrograph of duasyn blue nanomaterial when the ratio of the surfactant to the functional material is ca. 100.

After an appropriate time, the system was visibly homogeneous. The cloud point of the system was determined to be at 1258 psig. The formulation was expanded to ambient condition (atmospheric pressure, 24° C.) through a needle valve having a 0.0625 inch throat and an inner stainless steel capillary tube (ID=0.005 inch, OD=0.0625 inch, length=5 cm), with the needle partially opened for 5 seconds. The molar ratio of the surfactant Fomblin MF-300™ to the functional material Duasyn Acid Blue AE-02™ is about 100. FIG. 2, a transmission electron micrograph, shows the nanomaterial obtained through this technique to have average particle diameters from 0.5-5 nm. The material obtained was observed to have fluid-like properties.

Nuclear magnetic resonance testing of the sample obtained was performed.

| NMR characterization of the nanomaterial from example 1 | | |
|---|---|---|
| | Aromatic group on the dye | |
| Materials | Chemical shift (ppm) | Line width (Hz) |
| Duasyn Acid Blue solution in DMSO | 8.0-6.4 | 1 |
| Nanomaterial | 7.2-6.1 | 17 |

The significantly broader line width of the NMR peak due to the aromatic group in the dye in the nanofluid phase relative to that of the dye in DMSO solution indicates that most of the dye is in the small aggregate form, with only small amount in any other form (monomer, dimer, etc.)

Luminescence of the nanomaterial from example 1

| Materials | Excitation frequency (nm) | Emission frequency (nm) at maximum intensity |
|---|---|---|
| Duasyn Acid Blue powder | 488 | 758 |
| Nanomaterial | 488 | 692 |

Example 2

Precipitation of Duasyn Acid Blue AE-02™ Nanomaterial (Ratio of Surfactant to Functional Material=30)

Figure 3:
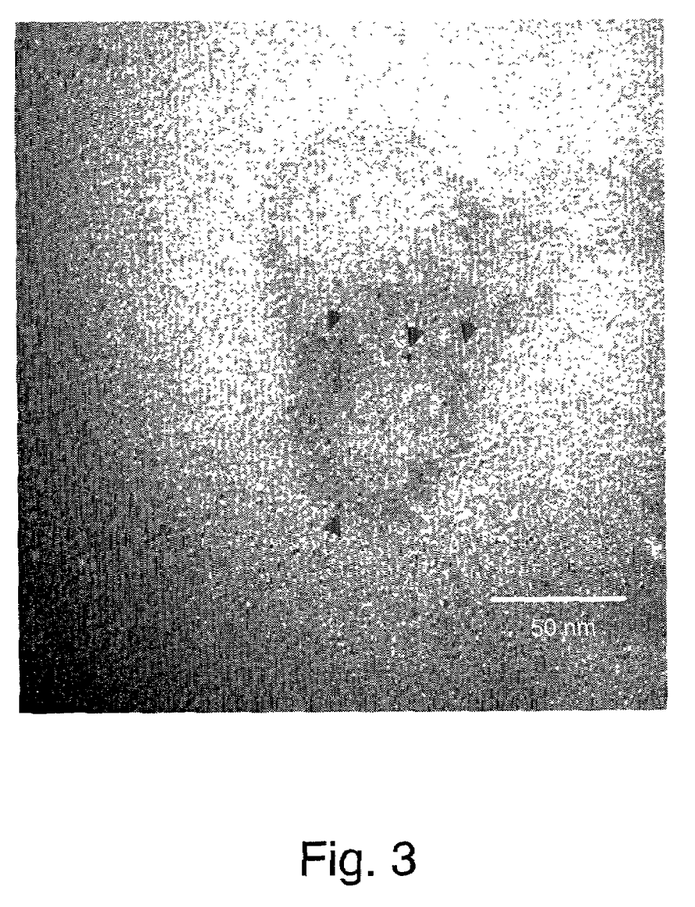
FIG. 3: Transmission electron micrograph of duasyn blue nanomaterial when the ratio of the surfactant to the functional material is ca. 30.

Example 1 was essentially repeated, with the difference that Fluorolink 7004™ (Ausimont Montedison Group, a surfactant of the formula $Cl(CF_2CF(CF_3)O)_n CF_2COONH_4^+$) was used in place of Fomblin MF-300™, with the molar ratio of the surfactant to the Duasyn Acid Blue AE-02 being 30:1. FIG. 3, a transmission electron micrograph, shows the nanomaterial obtained through this technique to have average particle diameters from 0.5-5 nm. The material obtained was observed to have fluid-like properties.

Example 3

Precipitation of Copper Phthalocyanine Nanomaterial 0.0126 g of Copper Phthalocyanine (CuPc) powder, 0.4763 g of Fluorolink 7004™, and 7.06 g of $CO_2$ were placed in a high pressure cell at 25.3° C. and 150 atm. and mixed.

CuPc

Hole Injection Layer

Figure 4:
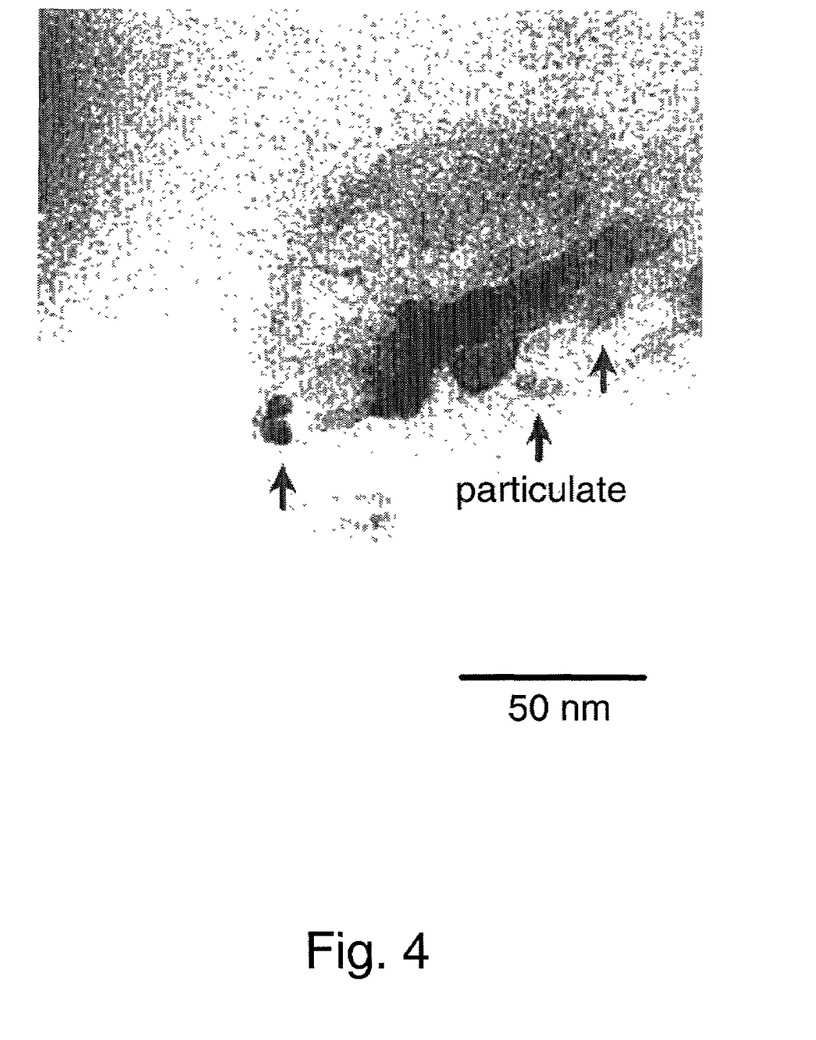
FIG. 4: Transmission electron micrograph of copper thalocyanine nanomaterial when the ratio of the surfactant to the functional material is ca. 100.

The molar ratio of the surfactant to the functional material copper phthalocyanine is about 100. After an appropriate time, the system was visibly homogeneous. The formulation was expanded to ambient condition through a needle valve for 5 seconds similarly as in Example 1. The precipitated material was collected and analyzed. FIG. 4, a transmission electron micrograph, shows the nanomaterial obtained through this technique to have average particle diameters from 0.5-5 nm.

Luminescence of the nanomaterial from example 3

| Materials | Excitation frequency (nm) | Emission frequency (nm) at maximum intensity |
|---|---|---|
| Cu-phthalocyanine powder | 488 | 793 |
| Nanofluid | 488 | 536 |

Example 4

Precipitation of Organic Light Emitting Diode Dopant (Compound C-545T) Nanomaterial 0.0058 g of compound C-545T powder, 0.555 g of Fluorolink 7004™, and 5.0 g of $CO_2$ were placed in a high pressure cell at 25.3° C. and 150 atm. and mixed.

C-545T

Green Dopant

Figure 5:
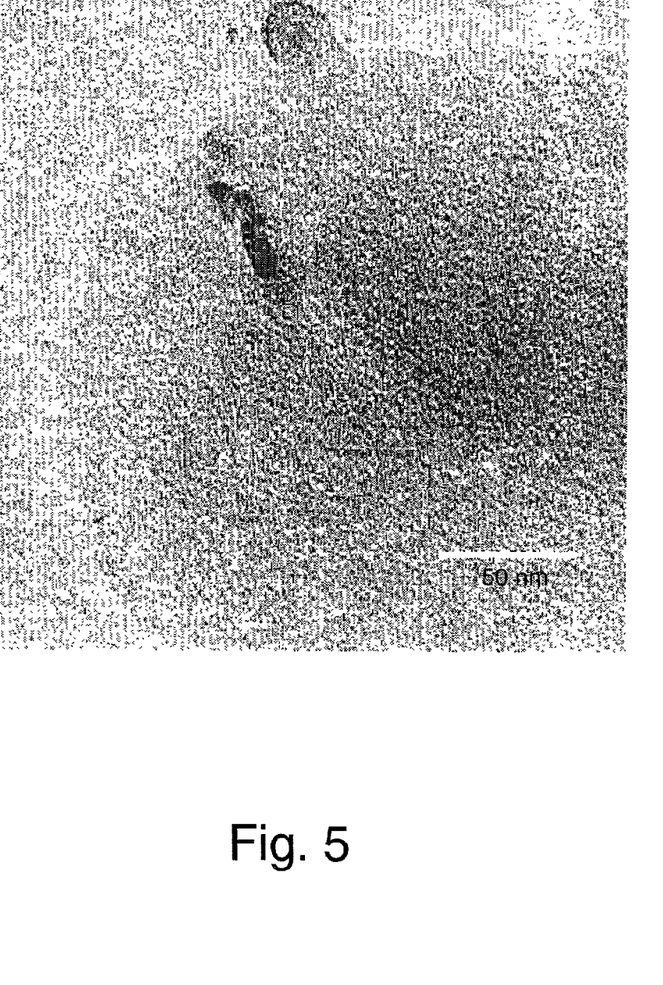
FIG. 5: Transmission electron micrograph of C-545T nanomaterial when the ratio of the surfactant to the functional material is ca. 100.

The molar ratio of the surfactant to the functional material is about 100. After an appropriate time, the system was visibly homogeneous. The formulation was expanded to ambient condition through a needle valve for 5 seconds similarly as in Example 1 to deposit C-545T on a substrate. The precipitated material was collected and analyzed. FIG. 5, a transmission electron micrograph, shows the nanomaterial obtained through this technique to have average particle diameters from 0.5-5 nm.

Luminescence of the nanomaterial from example 4

| Materials | Excitation frequency (nm) | Emission frequency (nm) at maximum intensity |
|---|---|---|
| C545T powder | 488 | 598 |
| Nanomaterial | 488 | 559 |

Example 5 and Comparison Example 5C

Comparison of the Effect of Surfactant on the Size of C545-T Nanoparticles

Figure 6:
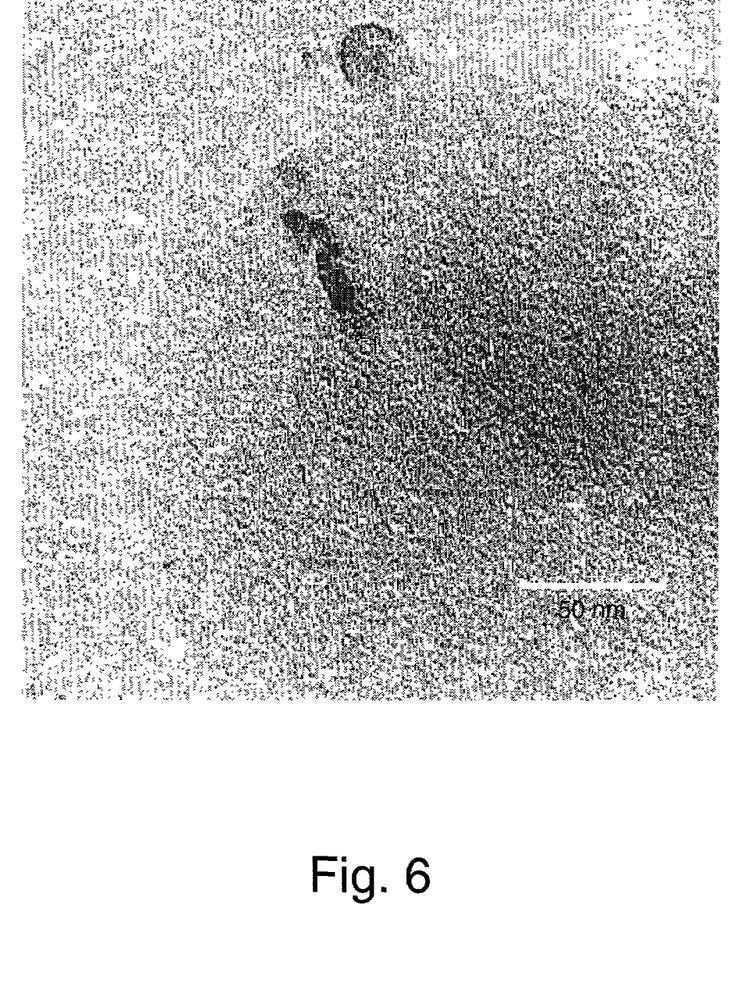
FIG. 6: Transmission electron micrograph of C-545T nanomaterial when the ratio of the surfactant to the functional material is ca. 76.
Figure 7:
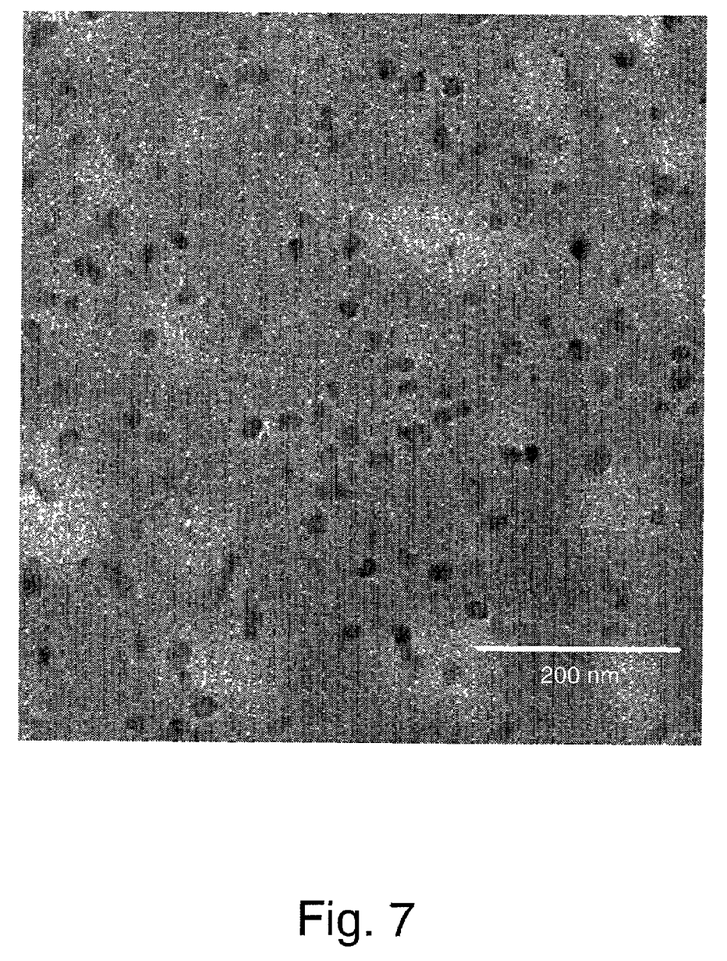
FIG. 7: Transmission electron micrograph of C-545T nanomaterial when the ratio of the surfactant to the functional material is 0.

Example 4 was essentially repeated, with the difference that the ratio of the surfactant to the C545T was either 76:1 (example 5) or 0:1 (example 5C). FIG. 6 transmission electron micrograph shows the nanomaterial obtained for Example 5, while FIG. 7 transmission electron micrograph shows the nanomaterial obtained for comparison example 5C. The average particle diameter in the presence of surfactant is about 2 nm while the average particle diameter in the absence of the surfactant is about 15 nm.

It is to be understood that elements not specifically shown or described may take various forms well known to those skilled in the art. Additionally, materials identified as suitable for various facets of the invention, for example, functional materials, are not limiting. These are to be treated as exemplary, and are not intended to limit the scope of the invention in any manner.

What is claimed is:

1. A process for the preparation of nanoscale particulate material comprising
   (i) combining one or more functional material to be precipitated as nanoscale particles and one or more surface active material in a compressed $CO_2$ phase with a density of at least 0.1 g/cc, where the functional material is substantially insoluble in the compressed $CO_2$ in the absence of the surfactant, the surfactant comprises a compressed $CO_2$-philic portion and a functional material-philic portion, wherein the functional material-philic portion of the surfactant comprises a $CO_2$-phobic portion, and the compressed $CO_2$ phase, functional material and surfactant interact to form an aggregated system having a continuous compressed $CO_2$ phase and a plurality of aggregates comprising surfactant and functional material molecules of average diameter less than 10 nanometers dispersed therein; and
   (ii) rapidly depressurizing the compressed $CO_2$ phase thereby precipitating the dispersed functional and surfactant materials in the form of composite particles of average diameter from 0.5 to less than 10 nanometers.

2. A process according to claim 1, where the molar ratio of the surfactant to the functional material is at least 1:1.

3. A process according to claim 1, where the molar ratio of the surfactant to the functional material is at least 10:1.

4. A process according to claim 1, where the molar ratio of the surfactant to the functional material is at least 30:1.

5. A process according to claim 1, where the molar ratio of the surfactant to the functional material is at least 100:1.

6. A process according to claim 1, wherein the compressed carbon dioxide is a compressed liquid.

7. A process according to claim 1, wherein the compressed carbon dioxide is a supercritical fluid.

8. A process according to claim 1, wherein the compressed carbon dioxide is a subcritical compressed gas.

9. A process according to claim 1, wherein the functional and surfactant materials are precipitated in the form of composite particles of average diameter from 0.5 to 5 nanometers.

10. A process according to claim 1, wherein the surfactant is a fluorinated, perfluoropolyether, or siloxane surfactant having a $CO_2$-philic portion and a $CO_2$-phobic portion.

11. A process according to claim 1, wherein the ratio of compressed carbon dioxide to functional material is from about 100,000:1 to about 1:1.

12. A process according to claim 1, wherein the ratio of compressed carbon dioxide to functional material is from about 5,000:1 to about 50:1.

13. A process according to claim 1, wherein the precipitated nanoscale material exhibits fluid-like properties and has a viscosity in the range 0.1 centipoise to $10^{10}$ centipoise.

14. A process according to claim 13, wherein the molar ratio of the surfactant to the functional material is at least 10:1.

15. A process according to claim 14, wherein the molar ratio of the surfactant to the functional material is at least 30:1.

16. A nanofluid obtained by the process of claim 13.

17. A nanofluid according to claim 16, wherein the functional and surfactant materials have been precipitated in the form of composite particles of average diameter from 0.5 to 5 nanometers.

* * * * *